United States Patent

Fukami et al.

[11] Patent Number: 5,857,754
[45] Date of Patent: Jan. 12, 1999

[54] VEHICLE MOTION CONTROL SYSTEM

[75] Inventors: Masanobu Fukami, Hazu gun; Kenji Tozu, Yokkaichi; Yoshiyuki Yasui, Kariya; Takayuki Itoh, Nagoya; Norio Yamazaki, Kariya, all of Japan

[73] Assignee: Aisin Seiki Kabushiki Kaisha, Kariya, Japan

[21] Appl. No.: 791,884

[22] Filed: Jan. 31, 1997

[30] Foreign Application Priority Data

Feb. 2, 1996 [JP] Japan .................................. 8-040590

[51] Int. Cl.$^6$ ........................................................ B60T 8/34
[52] U.S. Cl. ........................ 303/146; 303/140; 303/147; 701/72
[58] Field of Search .................................... 303/140, 146, 303/147, 186; 701/72, 41, 48; 180/197

[56] References Cited

U.S. PATENT DOCUMENTS 4,898,431  2/1990  Karnopp et al. .

FOREIGN PATENT DOCUMENTS

| 39 19 347 | 2/1990 | Germany . |
| 39 39 069 | 5/1991 | Germany . |
| 41 39 012 | 6/1992 | Germany . |
| 7-125625 | 5/1995 | Japan . |

*Primary Examiner*—Lee W. Young
*Attorney, Agent, or Firm*—Burns, Doane, Swecker & Mathis, LLP

[57] ABSTRACT

The present invention is directed to a vehicle motion control system for maintaining vehicle stability by controlling the braking force applied to at least one of the driven wheels and non-driven wheels of a vehicle. A vehicle motion control is performed by applying the braking force to at least one wheel, on the basis of a condition of the vehicle in motion and irrespective of depression of a brake pedal. The braking force is applied to at least one wheel so as to cause an increase in turning radius, when an excessive oversteer occurs during vehicle motion. Whereas, the braking force is applied to at least one wheel so as to cause a decrease in turning radius, when an excessive understeer occurs during vehicle motion. In the case where an excessive braking to at least one of the driven wheels is detected, when an engine brake is exerted on the vehicle, a correction control is performed to increase the braking force applied to at least one of the non-driven wheels. For example, when an excessive slip rate of at least one of the driven wheels is detected, a desired slip rate of at least one of the non-driven wheels is corrected.

7 Claims, 11 Drawing Sheets

VEHICLE MOTION CONTROL SYSTEM

BACKGROUND OF THE INVENTION

1. Field of the Invention

The present invention relates to a vehicle motion control system for controlling vehicle motion, and more particularly to the control system for restraining an excessive oversteer and excessive understeer which will occur during, for example, cornering, by applying a braking force to each wheel of the vehicle irrespective of depression of a brake pedal.

2. Description of the Related Arts

Recently, a vehicle is provided with a braking force control system for controlling the braking force applied to the vehicle to perform an anti-skid control, a traction control, a front-rear braking force distribution control, and etc. In the U.S. Pat. No. 4,898,431, for example, an apparatus for controlling vehicle motion through the use of a brake controlling system which compensates for the influence of lateral forces on the vehicle. The apparatus is constituted so as to control the braking force applied to the vehicle by the braking force control system in response to a comparison of a desired yaw rate with an actual yaw rate, thereby to improve the vehicle stability during the course of vehicle motion such as cornering.

In general, "oversteer" and "understeer" are used to indicate a vehicle steering characteristic. When the oversteer is excessive during vehicle motion such as cornering, the rear wheels of the vehicle have a tendency to slip excessively in the lateral direction to cause a decrease in turning radius of the vehicle. The oversteer occurs when a cornering force CFf of the front wheels largely exceeds a cornering force CFr of the rear wheels (i.e., CFf>>CFr). As shown in FIG. 14, when a vehicle VL is undergoing a cornering maneuver along a curve of a turning radius R, for example, a lateral acceleration Gy which is normal to the vehicle's path of motion is calculated in accordance with an equation of $Gy=V^2/R$, where "V" corresponds to a vehicle speed, and a total CFo of the cornering force is calculated in accordance with the following equation:

$$CFo=\Sigma CF=m \cdot Gy$$

where "m" corresponds to a mass of the vehicle VL. Accordingly, in the case where the sum of the cornering force CFf and the cornering force CFr is larger than the total cornering force CFo for the vehicle's cornering maneuver along the curve of the turning radius R (i.e., CFo<CFf+CFr), and the cornering force CFf of the front wheels largely exceeds the cornering force CFr of the rear wheels (i.e., CFf>>CFr), i.e., the oversteer is excessive, then the vehicle VL will be forced to turn in a direction toward the inside of the curve in the vehicle's path to cause a reduce in turning radius of the vehicle VL as shown in FIG. 14.

When the understeer is excessive during cornering, the lateral slip of the vehicle will be increased, the vehicle VL will be forced to turn in a direction toward the outside of the curve in the vehicle's path to cause an increase in turning radius of the vehicle VL as shown in FIG. 15. Thus, the excessive understeer occurs when the cornering force CFf of the front wheels is almost equal to the cornering force CFr of the rear wheels so as to be balanced with each other, or the latter is slightly larger than the former (i.e., CFf<CFr), and when the sum of the cornering force CFf and the cornering force CFr is smaller than the total cornering force CFo which is required for the vehicle's cornering maneuver along the curve of turning radius R (i.e., CFo>CFf+CFr), then the vehicle VL will be forced to turn in the direction toward the outside of the curve in the vehicle's path thereby to increase the turning radius R.

The excessive oversteer is determined on the basis of a vehicle side slip angle or vehicle slip angle β and a vehicle slip angular velocity Dβ, for example. When it is determined that the excessive oversteer occurs during cornering, a braking force will be applied to a front wheel located on the outside of the curve in the vehicle's path, for example, to produce a moment for forcing the vehicle to turn in the direction toward the outside of the curve, i.e., an outwardly oriented moment, in accordance with an oversteer restraining control, which may be called as a vehicle stability control. On the other hand, the excessive understeer is determined on the basis of a difference between a desired lateral acceleration and an actual lateral acceleration, or a difference between a desired yaw rate and an actual yaw rate, for example. When it is determined that the excessive understeer occurs while a rear-drive vehicle is undergoing a cornering maneuver, for example, the braking force will be applied to a front wheel located on the outside of the curve and applied to both of the rear wheels to produce a moment for forcing the vehicle to turn in the direction toward the inside of the curve, i.e., an inwardly oriented moment, in accordance with an understeer restraining control, which may be called as a course trace performance control. The above-described oversteer restraining control and understeer restraining control as a whole may be called as a steering control by braking.

In Japanese Patent Laid-open Publication No. 7-125625, there is disclosed an apparatus for correcting an abnormal motion of a vehicle by applying a braking force to each wheel. With respect to a prior apparatus, it is raised in the publication such a problem that a desired slip rate is determined only on the basis of a motion of the vehicle, irrespective of a driving condition of the vehicle driven in response to depression of an accelerator pedal, so that a vehicle driver's intention is never reflected during the correcting operation of the vehicle. According to the apparatus proposed in the publication, therefore, the desired slip rate is corrected in accordance with the braking force applied to a driven wheel, thereby to control the braking force smoothly and reflect the driver's intention.

According to the apparatus disclosed in the Patent Laid-open Publication No. 7-125625, however, a desired slip rate provided for a non-driven wheel is not corrected, while the desired slip rate provided for the driven wheel is corrected. Therefore, in the case where an engine brake is exerted on a vehicle during the above-described braking control thereof, if an actual slip rate of the driven wheel exceeds the desired slip rate, a lateral force of the driven wheel will be reduced to be lower than the desired value. As a result, the above-described steering control by braking might be deteriorated.

Since the above-described apparatus is aimed to reflect the driver's intention to accelerate the vehicle, it might be sufficient to correct the desired slip rate only for the driven wheel. However, when the driver release the accelerator pedal, the engine brake is caused to apply to the driven wheel the braking force which is to be made relatively large in a specific vehicle condition. Accordingly, a braking force exceeding the braking force which is necessary for the steering control by braking may be applied to the driven wheel, so that the lateral force to the driven wheel might be reduced. If the braking force caused by the engine brake is smaller than the desired braking force, the steering control by braking will not be deteriorated. However, the braking force may be increased by the engine brake to exceed the desired braking force, even when it is necessary to reduce the braking force during the steering control by braking. As a result, an excessive oversteer might be caused with respect to a rear-drive vehicle, and an excessive understeer might be caused with respect to a front-drive vehicle.

In such a condition that the engine brake is exerted on the vehicle, it is impossible to reduce the braking force applied to the driven wheel, which exceeds the desired braking force, but it is possible to increase the braking force applied to the non-driven wheel so as to balance the braking force between the front section and rear section of the vehicle, whereby the necessary lateral force can be obtained. In other words, if the braking force applied to the nondriven wheel is increased to balance with the braking force applied to the driven wheel so as to control a braking force distribution between the driven wheel and non-driven wheel to be a desired distribution for the steering control by braking, the necessary lateral force can be obtained. In stead, a driving force applied to the driven wheel can be reduced. In this case, however, it is necessary to provide another apparatus for controlling the driving force, so that the apparatus will become large in scale and high in cost.

SUMMARY OF THE INVENTION

Accordingly, it is an object of the present invention to provide a vehicle motion control system wherein an appropriate steering control by braking can be maintained, even if an engine brake is exerted on a vehicle during the steering control by braking.

In accomplishing the above and other objects, a vehicle motion control system is provided for maintaining stability of an automotive vehicle when the vehicle in motion, by controlling a braking force applied to one of driven wheels and non-driven wheels of the vehicle. In the system, therefore, braking means is provided for applying a braking force to each wheel of the vehicle, and vehicle condition monitor means is provided for monitoring a condition of the vehicle in motion. The braking means is adapted to be actuated in response to depression of a brake pedal, and actuated on the basis of an output of the monitor means and irrespective of depression of the brake pedal. Motion control means is provided for actuating the braking means to apply the braking force to at least one of the wheels on the basis of the output of the monitor means and irrespective of depression of the brake pedal. The motion control means is adapted to actuate the braking means to apply the braking force to at least one of the wheels so as to cause an increase in turning radius, when an excessive oversteer occurs during vehicle motion. And, the motion control means is adapted to actuate the braking means to apply the braking force to at least one of the wheels so as to cause a decrease in turning radius, when an excessive understeer occurs during vehicle motion. Excessive braking detection means is provided for detecting an excessive braking to at least one of the driven wheels, and correction control means is provided for controlling the motion control means to increase the braking force applied to at least one of the non-driven wheels, when the excessive braking detection means detects the excessive braking to the one of the driven wheels.

Preferably, the motion control means includes desired slip rate setting means for setting a desired slip rate for each wheel in accordance with at least the condition of the vehicle detected by the monitor means, actual slip rate measuring means for measuring an actual slip rate of each wheel, and slip rate deviation calculating means for calculating a deviation between the desired slip rate and the actual slip rate. Then, the braking means is adapted to apply the braking force to each wheel on the basis of the deviation calculated by the slip rate deviation calculating means. And, the correction control means may include slip rate correction means for correcting the desired slip rate of at least one of the non-driven wheels in accordance with the excessive braking to the one of the driven wheels detected by the excessive braking detection means.

The excessive braking detection means preferably includes excessive slip rate detection means for detecting an excessive slip rate of at least one of the driven wheels on the basis of the deviation between the desired slip rate and the actual slip rate of the one of the driven wheels. The slip rate correction means is adapted to correct the desired slip rate of at least one of the non-driven wheels in accordance with the excessive slip rate of the one of the driven wheels detected by the excessive slip rate detection means.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
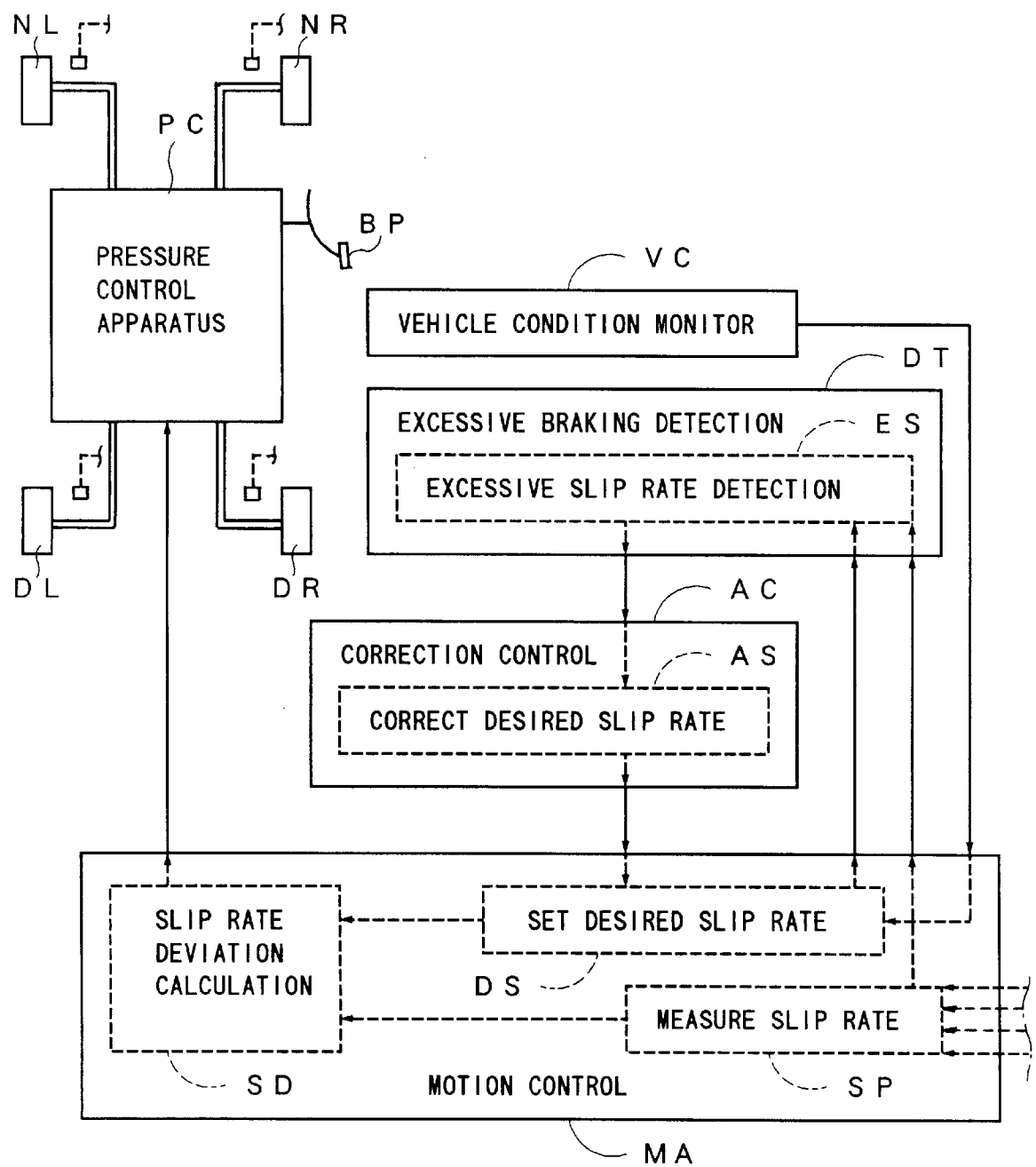
FIG. 1 is a general block diagram illustrating a vehicle motion control system according to the present invention.

Referring to FIG. 1, there is schematically illustrated a vehicle motion control system according to the present invention, which controls a braking force applied to front non-driven wheels NL, NR and rear driven wheels DL, DR of a vehicle individually. A vehicle condition monitor VC is provided for monitoring a condition of the vehicle in motion. A hydraulic braking pressure control apparatus PC is provided for applying the braking force to each wheel in response to depression of a brake pedal BP, and applying the braking force on the basis of an output of the monitor VC and irrespective of depression of the brake pedal BP. A motion control unit MA is provided for actuating the pressure control apparatus PC to apply the braking force to at least one of the wheels on the basis of the output of the monitor VC and irrespective of the braking condition resulted from depression of the brake pedal BP, respectively. The motion control unit MA is adapted to apply the braking force to at least one of the wheels so as to produce an outwardly oriented moment on the vehicle, i.e., so as to cause an increase in turning radius, when an excessive oversteer occurs during vehicle motion. Whereas, the motion control unit MA is adapted to apply the braking force to at least one of the wheels so as to produce an inwardly oriented moment on the vehicle, i.e., so as to cause a decrease in turning radius, when an excessive understeer occurs during vehicle motion. Then, an excessive braking detection unit DT is provided for detecting an excessive braking to one of the driven wheels DL, DR. And, a correction control unit AC is provided for controlling the motion control unit MA to increase the braking force applied to at least one of the non-driven wheels NL, NR, when the excessive braking detection unit DT detects the excessive braking to the one of the driven wheels DL, DR.

As illustrated by broken lines in FIG. 1, the motion control unit MA may include a desired slip rate setting unit DS which is adapted to set a desired slip rate for each wheel in accordance with at least the condition of the vehicle detected by the monitor VC, an actual slip rate measuring unit SP which is adapted to measure an actual slip rate of each wheel, and a slip rate deviation calculating unit SD which is adapted to calculate a deviation between the desired slip rate and the actual slip rate. The pressure control apparatus PC may be actuated to apply the braking force to each wheel on the basis of the deviation calculated by the slip rate deviation calculating unit SD. The correction control unit AC may include a slip rate correction unit AS which is adapted to correct the desired slip rate of at least one of the non-driven wheels NL, NR in accordance with the excessive braking to the one of the driven wheels DL, DR which is detected by the excessive braking detection unit DT. The excessive braking detection unit DT may include an excessive slip rate detection unit ES which is adapted to detect an excessive slip rate of at least one of the driven wheels DL, DR on the basis of the deviation between the desired slip rate and the actual slip rate of the one of the driven wheels DL, DR. The slip rate correction unit AS is adapted to correct the desired slip rate of at least one of the non-driven wheels NL, NR in accordance with the excessive slip rate of the one of the driven wheels DL, DR which is detected by the excessive slip rate detection unit ES.

The pressure control apparatus PC may include a master cylinder which generates a hydraulic braking pressure in response to depression of the brake pedal BP, and which will be described later, and an auxiliary pressure source having a hydraulic pump and an accumulator, which generates the hydraulic braking pressure irrespective of depression of the brake pedal BP, even in the absence of the brake pedal input, and which will be described later. The vehicle condition monitor VC may be so constituted to detect wheel speeds of the wheels, vehicle lateral acceleration, yaw rate and so on, and then calculate wheel accelerations, an estimated vehicle speed, and a vehicle slip angle on the basis of the detected signals, so that the condition of the vehicle in motion is monitored to determine if the excessive oversteer and/or the excessive understeer occur.

Figure 2:
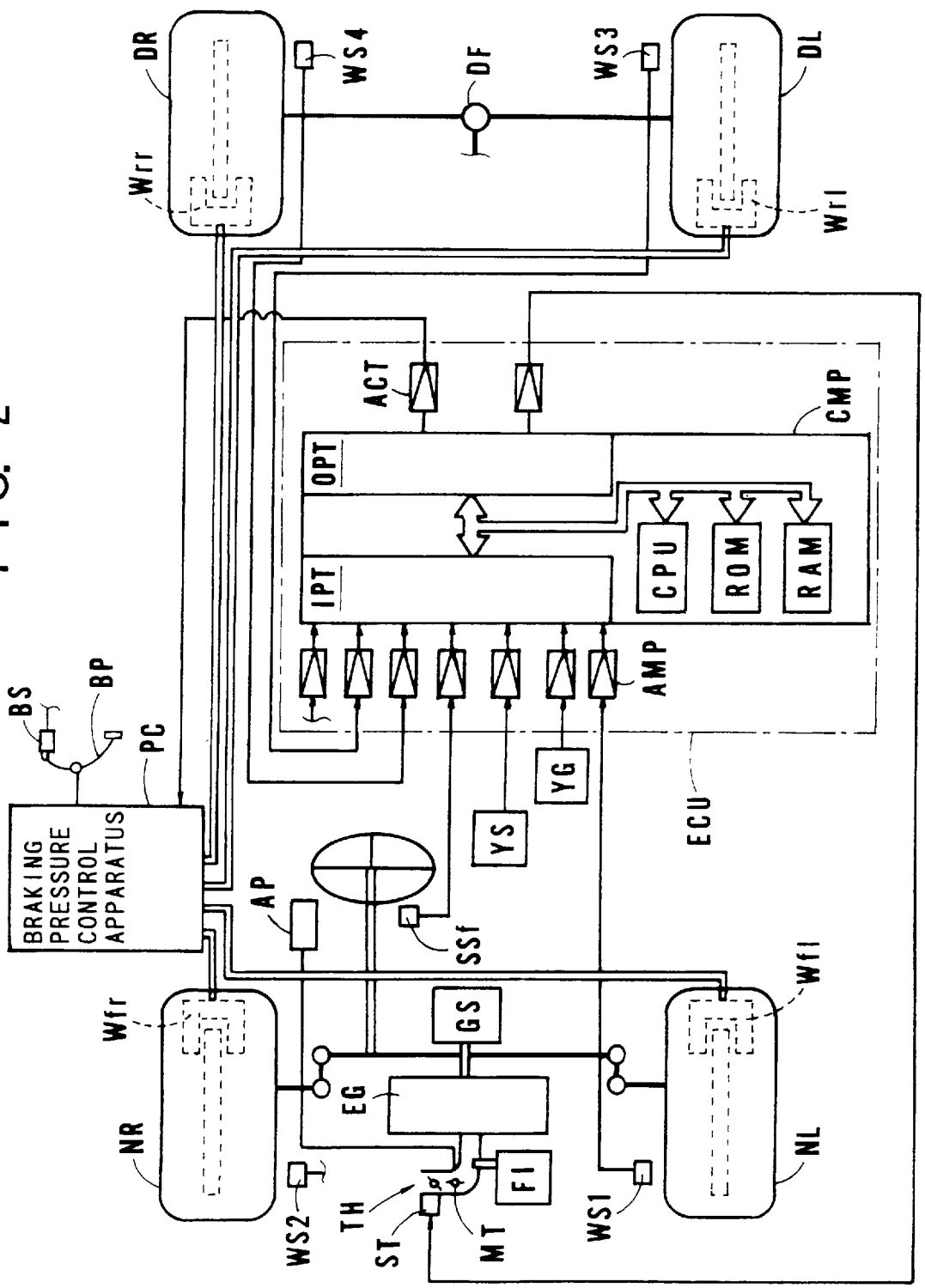
FIG. 2 is a schematic block diagram of a vehicle motion control system of an embodiment of the present invention.

More specifically, the details of the embodiment disclosed in FIG. 1 are illustrated in FIGS. 2 to 13. As shown in FIG. 2, the vehicle has an engine EG provided with a fuel injection apparatus FI and a throttle control apparatus TH which is arranged to control a main throttle opening of a main throttle valve MT in response to operation of an accelerator valve AP. The throttle control apparatus TH has a sub-throttle valve ST which is actuated in response to an output signal of an electronic controller ECU to control a sub-throttle opening. Also, the fuel injection apparatus FI is actuated in response to an output signal of the electronic controller ECU to control the fuel injected into the engine EG. According to the present embodiment, the engine EG is operatively connected with the rear wheels DL, DR through a transmission GS and a differential gear DF to provide a reardrive system, but the present embodiment is not limited to the rear drive system.

With respect to a braking system according to the present embodiment, wheel brake cylinders Wfl, Wfr, Wrl, Wrr are operatively mounted on the front non-driven wheels NL, NR and rear driven wheels DL, DR of the vehicle, respectively, and which is fluidly connected to a hydraulic braking pressure control apparatus PC. The wheel NL designates the wheel at the front left side as viewed from the position of a driver's seat, the wheel NR designates the wheel at the front right side, the wheel DL designates the wheel at the rear left side, and the wheel DR designates the wheel at the rear right side. According to the present embodiment, a front-rear dual circuit system is employed, while a diagonal circuit system may be employed. The pressure control apparatus PC is arranged to be actuated in response to operation of a brake pedal BP to control the hydraulic pressure supplied to each wheel brake cylinder, and may be selected from various known types. The pressure control apparatus PC in the present embodiment may be arranged as illustrated in FIG. 3 which will be explained later in detail.

As shown in FIG. 2, at the wheels NL, NR, DL and DR, there are provided wheel speed sensors WS1 to WS4 respectively, which are connected to an electronic controller ECU, and by which a signal having pulses proportional to a rotational speed of each wheel, i.e., a wheel speed signal is fed to the electronic controller ECU. There are also provided a brake switch BS which turns on when the brake pedal BP is depressed, and turns off when the brake pedal BP is released, a front steering angle sensor SSf for detecting a steering angle δf of the front wheels NL, NR, a lateral acceleration sensor YG for detecting a vehicle lateral acceleration, and a yaw rate sensor YS for detecting a yaw rate of the vehicle. These are electrically connected to the electronic controller ECU. According to the yaw rate sensor YS, a varying rate of rotational angle of the vehicle about a normal on the center of gravity of the vehicle, i.e., a yaw angular velocity or yaw rate γ is detected and fed to the electronic controller ECU. The yaw rate γ may be calculated on the basis of a wheel speed difference Vfd between the wheel speeds of non-driven wheels (wheel speeds Vwfl, Vwfr of the front wheels NL, NR in the present embodiment), i.e., Vfd=Vwfr−Vwfl, so that the yaw rate sensor YS may be omitted. Furthermore, between the wheels DL and DR may be provided a steering angle control apparatus (not shown), which enables a motor (not shown) to control a steering angle of the wheels DL, DR in response to the output of the electronic controller ECU.

As shown in FIG. 2, the electronic controller ECU is provided with a microcomputer CMP which includes a central processing unit or CPU, a read-only memory or ROM, a random access memory or RAM, an input port IPT, and an output port OPT, and etc. The signals detected by each of the wheel speed sensors WS1 to WS4, brake switch BS, front steering angle sensor SSf, yaw rate sensor YS and lateral acceleration sensor YG are fed to the input port IPT via respective amplification circuits AMP and then to the central processing unit CPU. Then, control signals are fed from the output port OPT to the throttle control apparatus TH and hydraulic pressure control apparatus PC via the respective driving circuits ACT. In the microcomputer CMP, the read-only memory ROM memorizes a program corresponding to flowcharts shown in FIGS. 6 to 9, the central processing unit CPU executes the program while the ignition switch (not shown) is closed, and the random access memory RAM temporarily memorizes variable data needed to execute the program. A plurality of microcomputers may be provided for each control such as throttle control, or may be provided for performing various controls, and electrically connected to each other.

Figure 3:
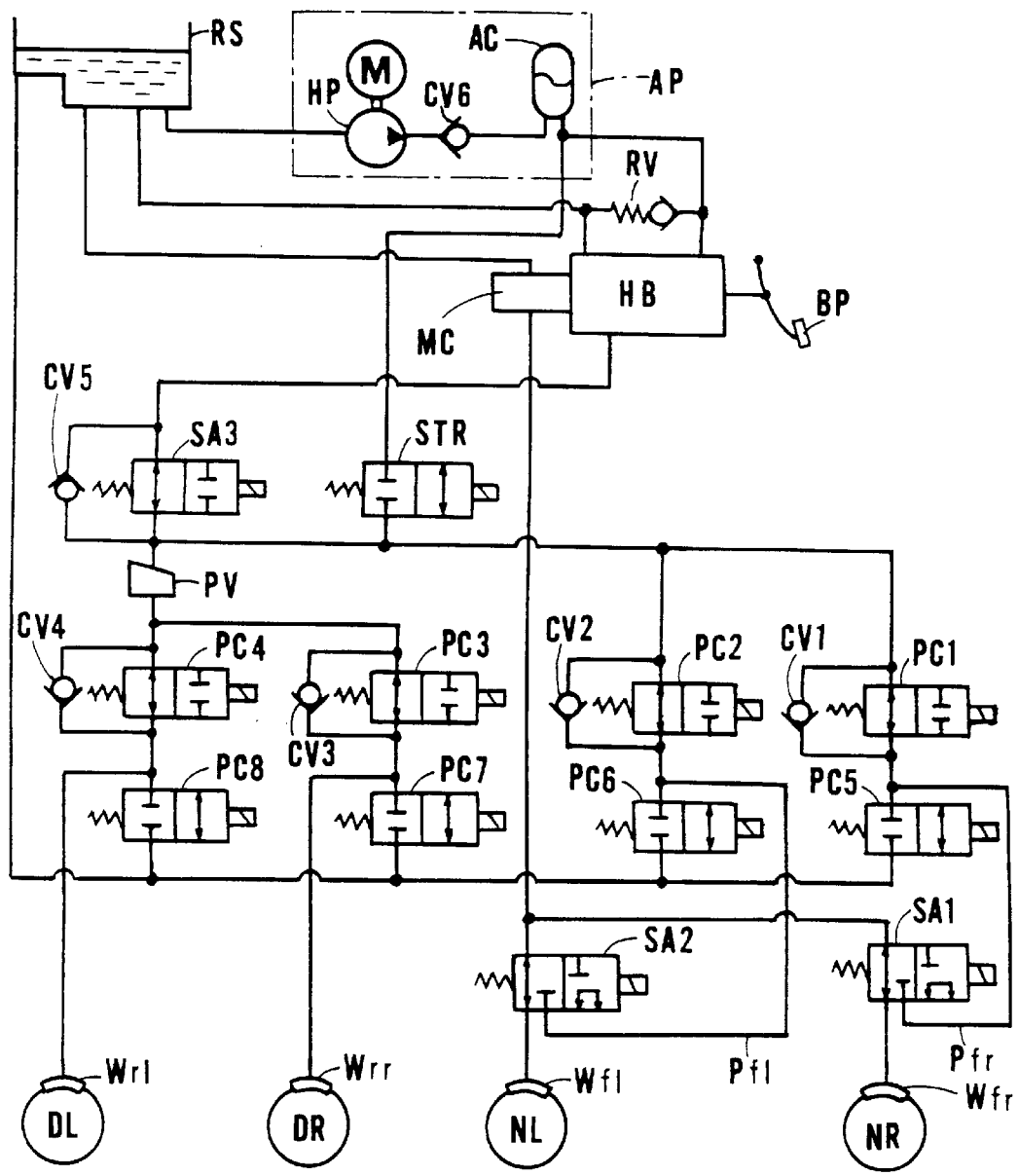
FIG. 3 is a block diagram illustrating an embodiment of a hydraulic braking pressure control apparatus for use in the above embodiment.

FIG. 3 shows an embodiment of the hydraulic braking pressure control apparatus PC which includes a master cylinder MC and a hydraulic booster HEB which are activated in response to depression of the brake pedal BP. The hydraulic booster HB is connected to an auxiliary pressure source AP, both of which are connected to a low pressure reservoir RS, to which the master cylinder MC is connected, as well. The auxiliary pressure source AP includes a hydraulic pressure pump HP and an accumulator AC. The pump HP is driven by an electric motor M to pressurize a brake fluid in the reservoir RS to discharge the pressurized brake fluid, or hydraulic braking pressure through a check valve CV6, into the accumulator AC to accumulate it therein. The electric motor M starts to operate when the pressure in the accumulator AC is decreased to be less than a predetermined lower limit, and stops when the pressure in the accumulator AC is increased to exceed a predetermined upper limit. A relief valve RV is provided between the accumulator AC and the reservoir RS. Accordingly, it is so arranged that a so-called power pressure is properly supplied from the accumulator AC to the hydraulic booster HB. The hydraulic booster HB introduces the hydraulic braking pressure discharged from the auxiliary pressure source AP and regulates it to a boost pressure in proportion to a pilot pressure discharged from the master cylinder MC, which is boosted by the boost pressure.

In a hydraulic pressure circuit for connecting the master cylinder MC with each of the front wheel brake cylinders Wfr, Wfl, disposed are solenoid valves SA1 and SA2 which are connected to solenoid valves PC1, PC5 and solenoid valves PC2, PC6, through control passages Pfr and Pfl, respectively. In the hydraulic pressure circuits for connecting the hydraulic booster HB with each of the wheel brake cylinder Wrl and etc., a solenoid valve SA3, solenoid valves PC1–PC8 for use in the control of discharging and draining of the brake fluid are disposed, and a proportioning pressure decreasing valve PV is disposed at the rear wheels' side. Then, the auxiliary pressure source AP is connected to the downstream side of the solenoid valve SA3 through a solenoid valve STR. The hydraulic circuits are divided into the front circuit system and the rear circuit system as shown in FIG. 3 to form the front and rear dual circuit system according to the present embodiment.

With respect to the front hydraulic pressure circuit, the solenoid valves PC1 and PC2 are connected to the solenoid valve STR, which is of a two-port two-position solenoid operated valve normally closed and activated to communicate the solenoid valves PC1 and PC2 directly with the accumulator AC. The solenoid valves SA1 and SA2 are of a three-port two-position solenoid operated valve which is placed in a first operating position as shown in FIG. 3, when it is not energized, through which each of the wheel brake cylinders Wfr and Wfl is communicated with the master cylinder MC. When the solenoid valves SA1 and SA2 are energized, they are placed in their second operating positions, respectively, where both of the wheel brake cylinders Wfr and Wfl are prevented from communicating with the master cylinder MC, while the wheel brake cylinder Wfr is communicated with the solenoid valves PC1 and PC5, and the wheel brake cylinder Wfl is communicated with the solenoid valves PC2 and PC6, respectively. in parallel with the solenoid valves PC1 and PC2, check valves CV1 and CV2 are disposed, respectively. The inlet side of the check valve CV1 is connected to the passage Pfr, and the inlet side of the check valve CV2 is connected to the passage Pfl. The check valve CV1 is provided for allowing the flow of the brake fluid toward the hydraulic booster HB and preventing the reverse flow. In the case where the solenoid valve SA1 is energized to be placed in its second position, therefore, if the brake pedal BP is released, the hydraulic pressure in the wheel ff brake cylinder Wfr is rapidly reduced to the pressure discharged from the hydraulic booster HB. The check valve CV2 is provided in the same manner as the check valve CV1.

With respect to the rear hydraulic pressure circuit, the solenoid valve SA3 is of a two-port two-position solenoid operated valve, which is normally opened as shown in FIG. 3, so that the solenoid valves PC3 and PC4 are communicated with the hydraulic booster HB through the proportioning valve PV. In this case, the solenoid valve STR is placed in its closed position to shut off the communication with the accumulator AC. When the solenoid valve SA3 is energized, it is placed in its closed position, where both of the solenoid valves PC3 and PC4 are prevented from communicating with the hydraulic booster HB, while they are communicated with the solenoid valve STR through the proportioning valve PV, so that they are communicated with the accumulator AC when the solenoid valve STR is energized. In parallel with the solenoid valves PC3 and PC4, check valves CV3 and CV4 are disposed, respectively. The inlet side of the check valve CV3 is connected to the wheel brake cylinder Wrr, and the inlet side of the check valve CV4 is connected to the wheel brake cylinder Wrl. The check valves CV3 and CV4 are provided for allowing the flow of the brake fluid toward the solenoid valve SA3 and preventing the reverse flow. If the brake pedal BP is released, therefore, the hydraulic pressure in each of the wheel brake cylinders Wrr, Wrl is rapidly reduced to the pressure discharged from the hydraulic booster HB. Furthermore, the check valve CV5 is disposed in parallel with the solenoid valve SA3, so that the brake fluid may be supplied from the hydraulic booster HB to the wheel brake cylinders in response to depression of the brake pedal BP.

The above-described solenoid valves SA1, SA2, SA3, STR, and solenoid valves PC1–PC8 are controlled by the electronic controller ECU to provide various control modes for controlling the stability of the vehicle, such as the steering control by braking, anti-skid control, and other various control modes. For example, when the steering control by braking, which is to be executed irrespective of depression of the brake pedal BP, is performed, the hydraulic pressure is not discharged from the hydraulic booster HB and master cylinder MC. Therefore, the solenoid valves SA1 and SA2 are placed in their second positions, the solenoid valve SA3 is placed in its closed position, and then the solenoid valve STR is placed in its open position, so that the power pressure can be discharged to the wheel brake cylinder Wfr and so on, through the solenoid valve STR and any of the solenoid valves PC1–PC8 placed in their open positions. Consequently, with the solenoid valves PC1–PC8 energized or de-energized, the hydraulic pressure in each wheel cylinder is rapidly increased in the rapid pressure increasing zone, gradually increased in the pulse pressure increasing zone, gradually decreased in the pulse pressure decreasing zone, rapidly decreased in the rapid pressure decreasing zone, and held in the pressure holding zone, so that the oversteer restraining control and/or the understeer restraining control can be performed, as noted previously.

Figure 4:
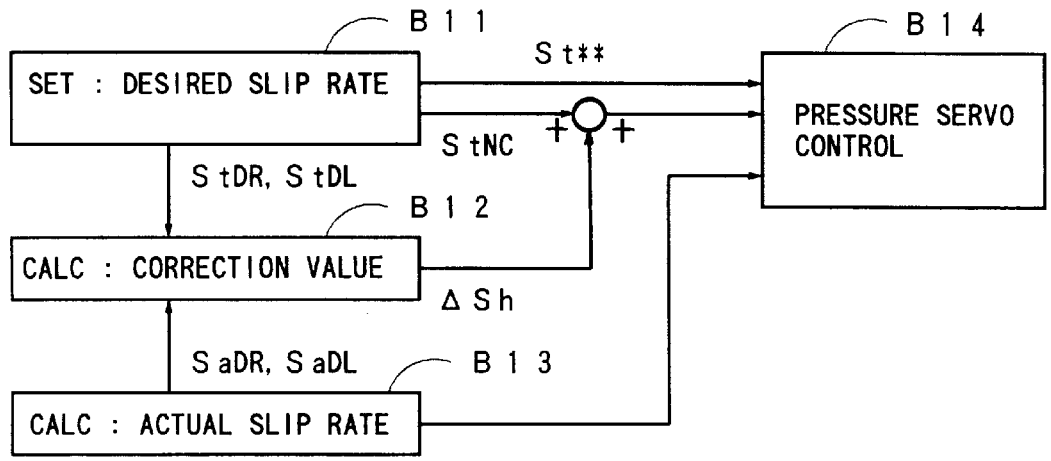
FIG. 4 is a block diagram showing a part of blocks processed in the system of the above embodiment of the present invention.

FIG. 4 shows a part of blocks processed in the microcomputer CMP. In a block B11, a desired slip rate StNC for a non-driven wheel NC (NC represents the non-driven wheels NL, NR to be controlled) is set for use in a hydraulic pressure servo control which will be described later, and the desired slip rates StDL, StDR for the driven wheels DL, DR are set as well. A correction value ΔSh is calculated at a block B12, and added to the desired slip rate StNC so as to renew the desired slip rate StNC for the non-driven wheel NC which is provided for the pressure servo control in a block B14. In a block B13, an actual slip rate Sa ( represents one of the wheels NL, NR, DL, DR) for each wheel is calculated on the basis of a wheel speed Vw** of each wheel and an estimated vehicle speed Vso in accordance with the following equation:

$$Sa^{}=(Vso-Vw^{})/Vso$$

This slip rate Sa** is used for the pressure servo control in the block B14, and the actual slip rates SaDL, SaDR are provided for the calculation of the correction value ΔSh in the block B12 as explained hereinafter.

Figure 5:
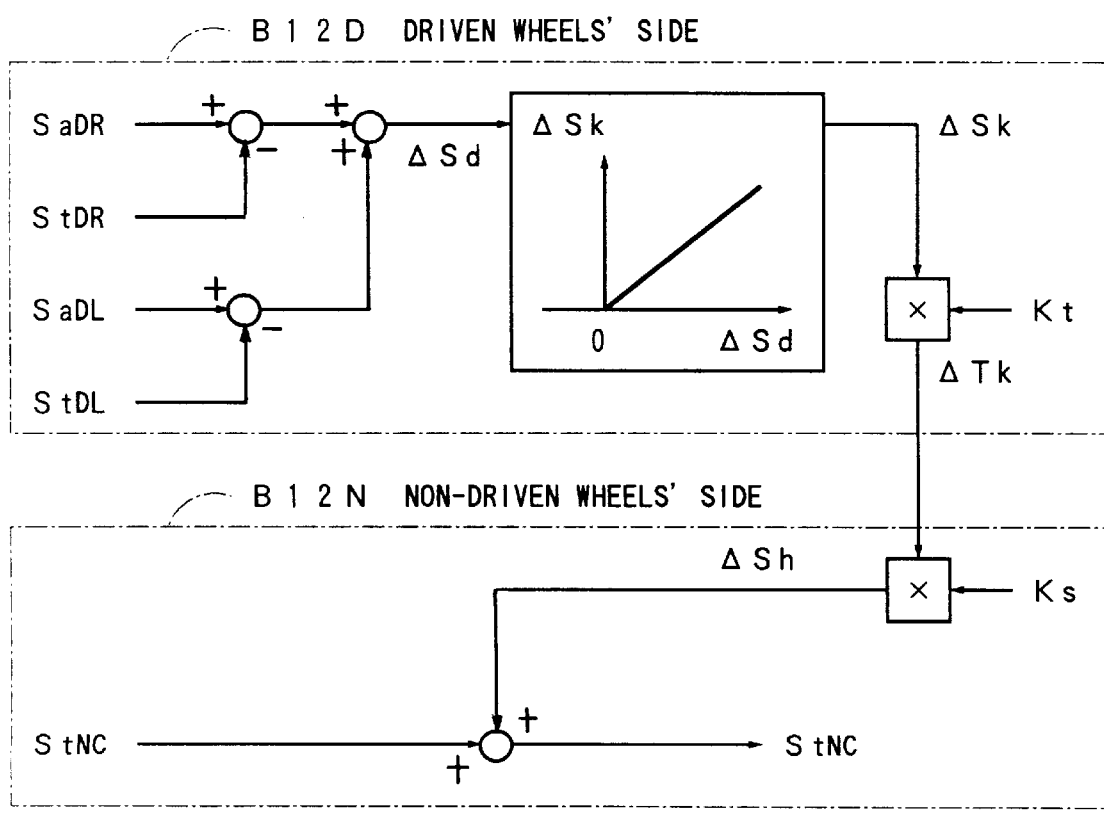
FIG. 5 is a block diagram showing a function for setting a desired slip rate for non-driven wheels according to the above embodiment of the present invention.

The correction value ΔSh is calculated in accordance with steps as shown in FIG. 5. That is, a deviation between the actual slip rate SaDR and the desired slip rate StDR with respect to the driven wheel DR, and a deviation between the actual slip rate SaDL and the desired slip rate StDL with respect to the driven wheel DL are calculated, respectively, and added to provide a slip rate deviation ΔSd. A positive value of the slip rate deviation ΔSd is determined to correspond to an excessive slip rate ΔSk, to which a conversion factor Kt is multiplied to provide an excessive torque ΔTk which is used for controlling the braking force applied to the non-driven wheels NL, NR. In general, a torque T** applied to each tire of the wheel is calculated in accordance with the following equation:

$$T^{}=\mu^{}\cdot W^{**}\cdot R$$

where "W" is a load applied to each wheel, and "R" is a radius of a tire for each wheel. "$\mu^{}$" is a coefficient of friction for each wheel which is calculated in accordance with a function of the actual slip rate Sa and a vehicle slip angle β, i.e., $\mu^{}=f(Sa^{}, \beta)$. By using $\alpha^{}$ for $(d\mu^{}/dSa^{})$, ΔT** may be indicated by the following equation:

$$\Delta T^{}=\alpha^{}\cdot \Delta Sa^{}\cdot W^{}\cdot R$$

Since the conversion factor Kt may be indicated by Kt=αDA·WDA·R, where "DA" indicates a mean value of the left and right driven wheels, the excessive torque ΔTk may be calculated by multiplying the excessive slip rate ΔSk and the conversion factor Kt, i.e., ΔTk=ΔSk·Kt.

The above-described vehicle slip angle β is an angle which corresponds to a vehicle slip against the vehicle's path of motion, and which can be estimated as follows. That is, at the outset, the vehicle slip angular velocity Dβ, which is a differentiated value of the vehicle slip angle β, is calculated in accordance with the following equation:

$$D\beta=Gy/Vso-\gamma$$

Then, the vehicle slip angle β is calculated in accordance with the following equation:

$$\beta=\int(Gy/Vso-\gamma)dt$$

where "Gy" is the lateral acceleration of the vehicle, "Vso" is the estimated vehicle speed of the vehicle measured at its gravity center, and "γ" is the yaw rate. The vehicle slip angle β may be calculated in accordance with the following equation:

$$\beta=\tan^{-1}(Vy/Vx)$$

where "Vx" is a longitudinal vehicle speed, and "Vy" is a lateral vehicle speed.

Then, in a block B12N provided for the non-driven wheels as shown in FIG. 5, a correction value ΔSh, which is to be added at the non-driven wheels' side in response to the excessive torque ΔTk, is calculated in accordance with the following equation:

$$\Delta Sh=Ks\cdot Kt\cdot \Delta Sk$$

where "Ks" is a conversion factor which is obtained by Ks=1/αNC·WNC·R, where "αNC" and "WNC" are α and W for the wheel to be controlled, respectively. Accordingly, the correction value ΔSh may be calculated in accordance with the following equation:

$$\Delta Sh=\Delta Sk\cdot (\alpha DA\cdot WDA)/(\alpha NC\cdot WNC)$$

Then, the correction value ΔSh is added to the desired slip rate StNC for the non-driven wheel (one wheel) to be controlled, so as to renew the desired slip rate StNC.

Figure 6:
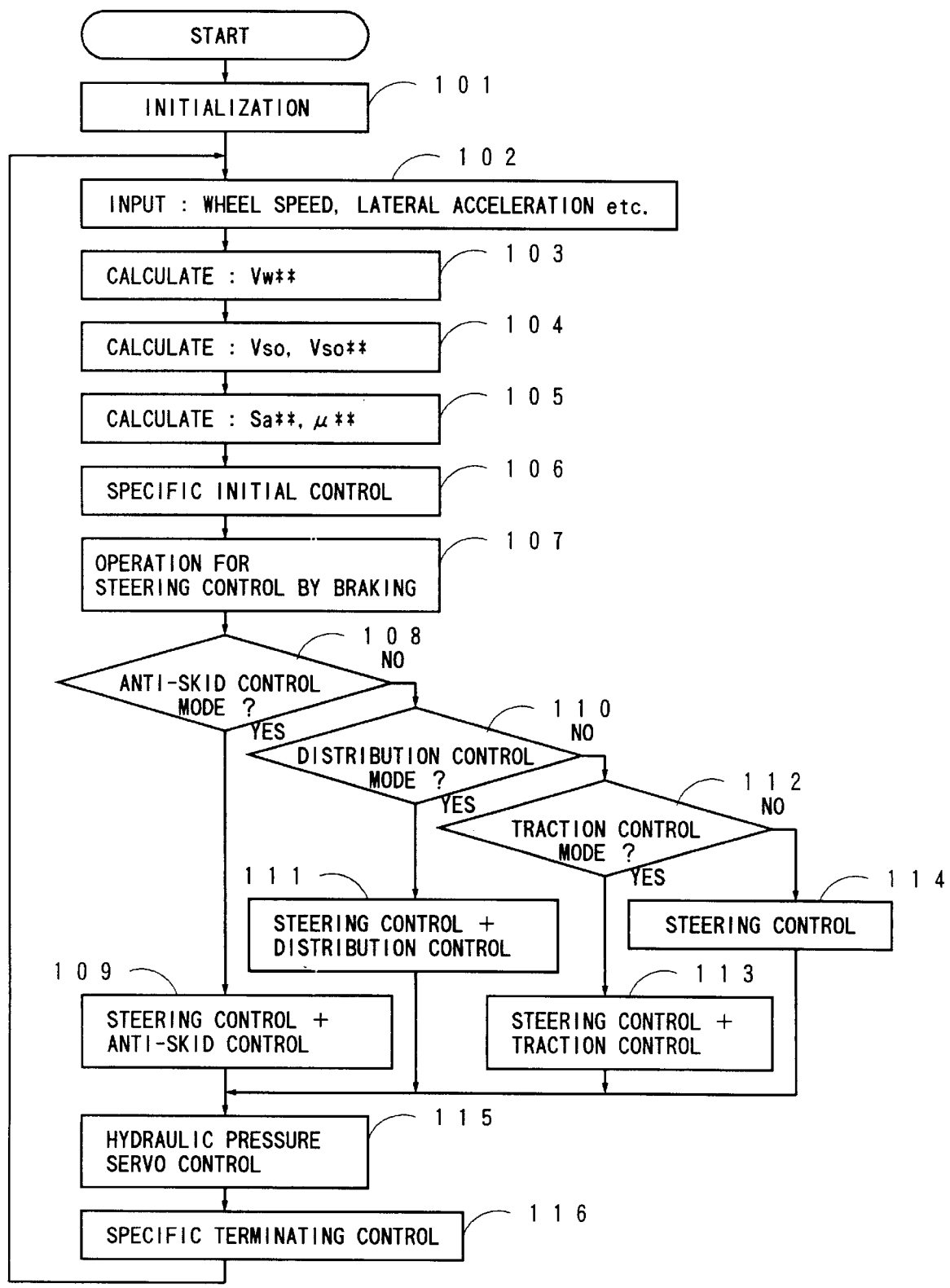
FIG. 6 is a flowchart showing a main routine of the vehicle motion control according to the above embodiment of the present invention.

According to the present embodiment as constituted above, a program routine for the vehicle motion control including the steering control by braking, anti-skid control and so on is executed by the electronic controller ECU, as will be described hereinafter with reference to FIGS. 6 to 9. The program routine starts when an ignition switch (not shown) is turned on. At the outset, the program for the vehicle motion control as shown in FIG. 6 provides for initialization of the system at Step 101 to clear various data. At Step 102, the signals detected by the wheel speed sensors WS1 to WS4 are read by the electronic controller ECU, and also read are the signal (steering angle δ f) detected by the front steering angle sensor SSf, the signal (actual yaw rate γ) detected by the yaw rate sensor YS, and the signal (actual lateral acceleration Gya) detected by the lateral acceleration sensor YG.

Then, the program proceeds to Step 103 where the wheel speed Vw of each wheel is calculated, and the estimated vehicle speed Vso (=MAX[Vw]), and an estimated vehicle speed Vso is calculated for each wheel, respectively, on the basis of the wheel speed Vw at Step 104. The estimated vehicle speed Vso may be normalized to reduce the error caused by a difference between the wheels located on the inside and outside of the curve while cornering. That is, the estimated and normalized vehicle speed NVso is calculated in accordance with the following equation:

$$NV_{SO} = V_{SO}(n) - \Delta Vr**(n)$$

where $\Delta Vr(n)$ is a correction factor provided for correction during cornering, as follows: That is, the correction factor $\Delta Vr(n)$ is set on the basis of a turning radius R and $\gamma \cdot V_{SO}FW$ (FW represents front wheels) which is nearly equal to the lateral acceleration Gya, according to a map (not shown) provided for each wheel except for a reference wheel. If $\Delta VrNL$ is employed as a reference value for example, it is set to be zero. Then, $\Delta VrNR$ is set according to a map provided for the difference between two wheels located on the inside and outside of the curve during cornering. With respect to the rear wheels, $\Delta VrDL$ is set according to a map provided for the difference between two wheels both located on the inside of the curve during cornering, while $\Delta VrDR$ is set according to a map provided for the difference between two wheels both located on the outside of the curve during cornering, and also according to the map provided for the difference between two wheels located on the inside and the outside of the curve during cornering.

At Step 105, also calculated is an actual slip rate Sa on the basis of the wheel speed Vw for each wheel and the estimated vehicle speed Vso (or, the estimated and normalized vehicle speed NVso**) which are calculated at Steps 103 and 104, respectively, in accordance with the following equation:

$$Sa = (V_{SO} - V_w)/V_{SO}$$

Furthermore, on the basis of the slip rate Sa and the vehicle slip angle β, the coefficient of friction $\mu$ is provided for each wheel.

The program further proceeds to Step 105, where the estimated vehicle speed Vso obtained at Step 104 may be differentiated to provide a longitudinal vehicle acceleration DVso. On the basis of the vehicle acceleration DVso and the actual lateral acceleration Gya detected by the lateral acceleration sensor YG, the coefficient of friction $\mu$ of each wheel against a road surface can be calculated in accordance with the following equation:

$$\mu \approx (DV_{SO}^2 + Gya^2)^{1/2}$$

In order to detect the coefficient of friction against the road surface, various methods may be employed other than the above method, such as a sensor for directly detecting the coefficient of friction against the road surface, for example.

Then, the program proceeds to Step 106 where a specific initial control for providing initial pressure is performed, and then to Step 107 where an operation for the steering control by braking is made to provide a desired slip rate for use in the steering control by braking, wherein the braking force applied to each wheel is controlled at Step 114 through the hydraulic pressure servo control which will be performed later at Step 115, so that the pressure control apparatus PC is controlled in response to the condition of the vehicle in motion. The steering control by braking is to be added to each control performed in all the control modes described later. The specific initial control may be performed before the steering control by braking starts, and also may be performed before the traction control starts, but it shall be terminated immediately after the anti-skid control starts. Then, the program proceeds to Step 108, where it is determined whether the condition for initiating the anti-skid control is fulfilled or not. If it is determined that the condition is in the anti-skid control mode, the specific initial control is terminated immediately at Step 109, where a control mode performing both the steering control by braking and the anti-skid control start.

If it is determined at Step 108 that the condition for initiating the anti-skid control has not been fulfilled, then the program proceeds to Step 110 where it is determined whether the condition for initiating the front and rear braking force distribution control is fulfilled or not. If it is affirmative at Step 110, the program further proceeds to Step 111 where a control mode for performing both the steering control by braking and the braking force distribution control is performed, otherwise it proceeds to Step 112, where it is determined whether the condition for initiating the traction control is fulfilled or not. If the condition for initiating the traction control is fulfilled, the program proceeds to Step 113 where a control mode for performing both the steering control by braking and the traction control is performed. Otherwise, a control mode for performing only the steering control by braking is set at Step 114. On the basis of the control modes as set in the above, the hydraulic pressure servo control is performed at Step 115, then the program proceeds to Step 116 where a specific terminating control is performed, and then the program returns to Step 102. In accordance with the control modes set at Steps 109, 111, 113, 114, the sub-throttle opening angle for the throttle control apparatus TH may be adjusted in response to the condition of the vehicle in motion, so that the output of the engine EG could be reduced to limit the driving force produced thereby.

According to the above-described anti-skid control mode, the braking force applied to each wheel is controlled so as to prevent the wheel from being locked during the vehicle braking operation. In the front-rear braking force distribution control mode, a distribution between the braking force applied to rear wheels and the braking force applied to front wheels is controlled so as to maintain the vehicle stability during the vehicle braking operation. Further, in the traction control mode, the braking force is applied to the driven wheel, and the throttle control is performed, so as to prevent the driven wheel from slipping during the vehicle driving operation.

Figure 7:
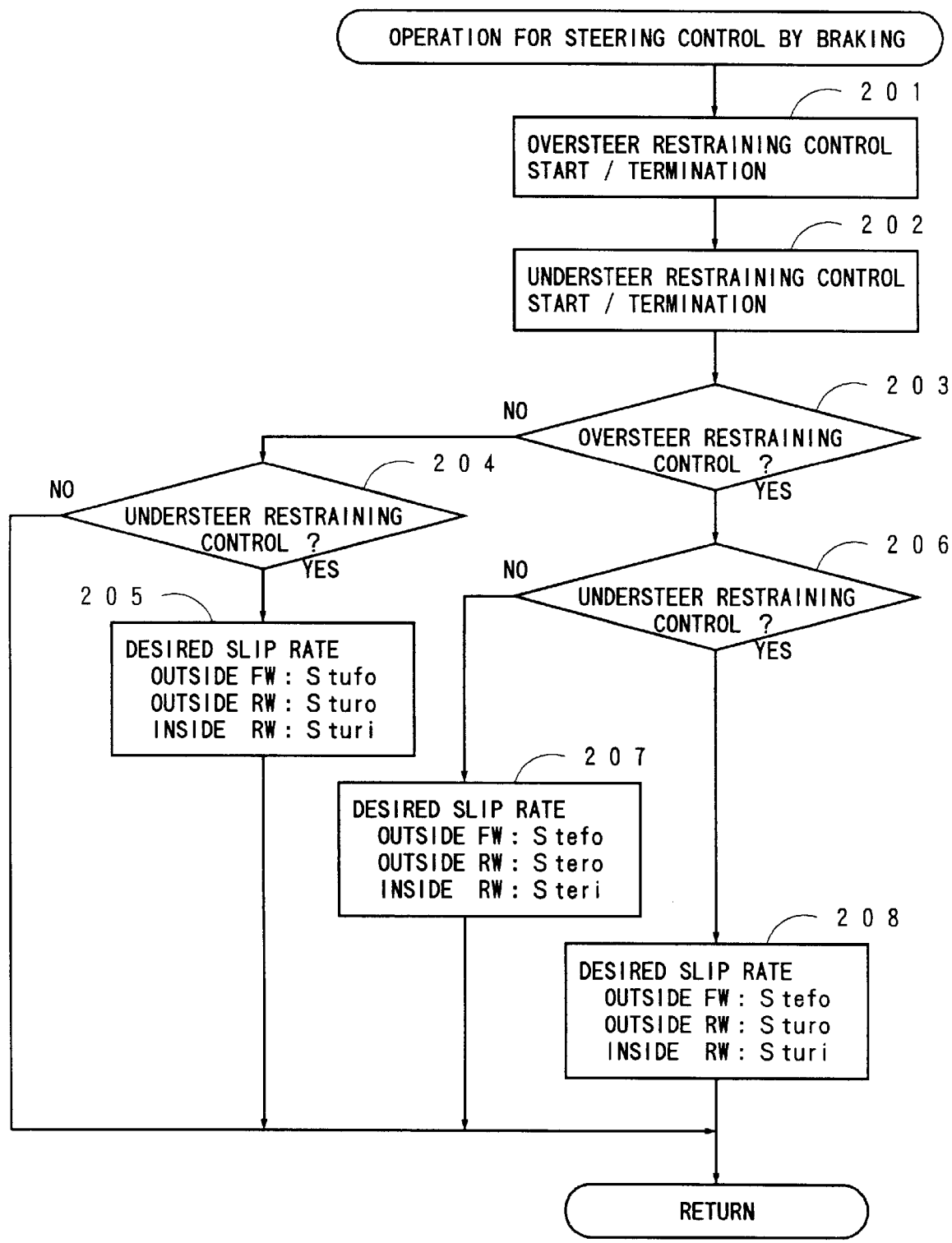
FIG. 7 is a flowchart showing a sub-routine of a steering control by braking according to the above embodiment of the present invention.
Figure 10:
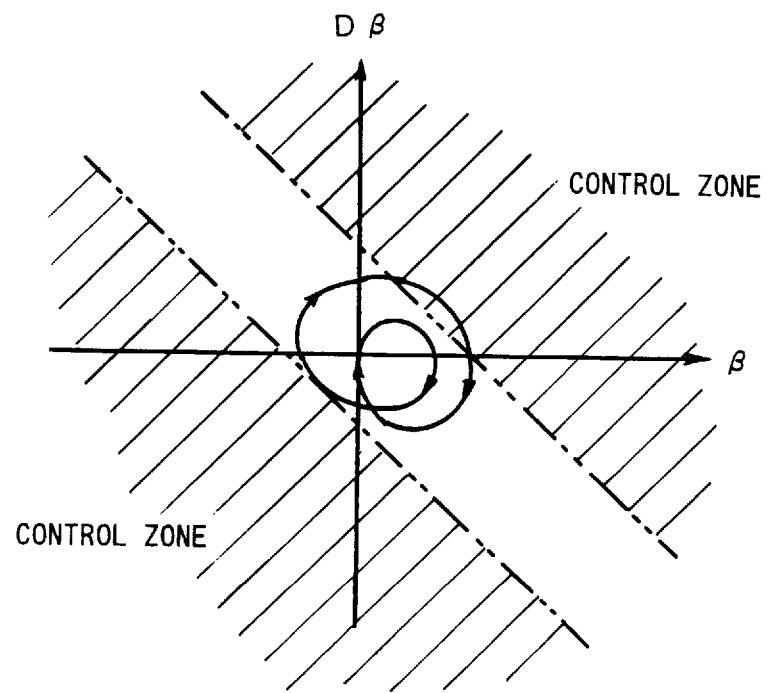
FIG. 10 is a diagram showing a region for determining start and termination of the oversteer restraining control according to above embodiment of the present invention.

FIG. 7 shows a flowchart for setting desired slip rates which are to be provided at Step 107 in FIG. 6 for the operation of the steering control by braking, which includes the oversteer restraining control and the understeer restraining control. Through this flowchart, therefore, the desired slip rates are set in accordance with the oversteer restraining control and/or the understeer restraining control. At the outset, it is determined at Step 201 whether the oversteer restraining control is to be started or terminated, and also determined at Step 202 whether the understeer restraining control is to be started or terminated. More specifically, the determination is made at Step 201 on the basis of the determination whether it is within a control zone indicated by hatching on a β–Dβ plane as shown in FIG. 10. That is, if the vehicle slip angle β and the vehicle slip angular velocity Dβ which are calculated when determining the start or termination, are fallen within the control zone, the oversteer restraining control will be started. However, if the vehicle slip angle β and the vehicle slip angular velocity Dβ come to be out of the control zone, the oversteer restraining control will be controlled as indicated by the arrow in FIG. 10 thereby to be terminated. And, the braking force applied to each wheel is controlled in such a manner that the farther they remote from the boundary between the control zone and non-control zone (as indicted by two dotted chain line in FIG. 10) toward the control zone, the more the amount to be controlled will be provided.

Figure 11:
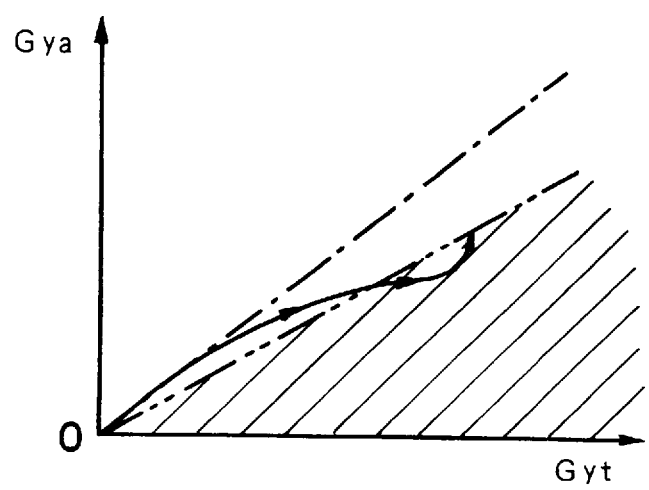
FIG. 11 is a diagram showing a region for determining start and termination of the understeer restraining control according to above embodiment of the present invention.

On the other hand, the determination of the start and termination is made at Step 202 on the basis of the determination whether it is within a control zone indicated by hatching in FIG. 11. That is, in accordance with the variation of the actual lateral acceleration Gya against a desired lateral acceleration Gyt, if they become out of the desired condition as indicated by one dotted chain line, and fallen within the control zone, then the understeer restraining control will be started. If they come to be out of the zone, the understeer restraining control will be controlled as indicated by the arrow in FIG. 11 thereby to be terminated.

Then, the program proceeds to Step 203 where it is determined whether the oversteer restraining control is to be performed or not. If the oversteer restraining control is not to be performed, the program further proceeds to Step 204 where it is determined whether the understeer restraining control is to be performed or not. In the case where the understeer restraining control is not to be performed, the program returns to the main routine. In the case where it is determined at Step 204 that the understeer restraining control is to be performed, the program proceeds to Step 205 where the desired slip rate of each wheel is set to a desired slip rate which is provided for use in the understeer restraining control. If it is determined at Step 203 that the oversteer restraining control is to be performed, the program proceeds to Step 206 where it is determined whether the understeer restraining control is to be performed or not. In the case where the understeer restraining control is not to be performed, the program proceeds to Step 207 where the desired slip rate of each wheel is set to a desired slip rate which is provided for use in the oversteer restraining control. In the case where it is determined at Step 206 that the understeer restraining control is to be performed, the program proceeds to Step 208 where the desired slip rate of each wheel is set to a desired slip rate which is provided for use in both of the oversteer restraining control and the understeer restraining control.

With respect to the desired slip rate for use in the oversteer restraining control, the vehicle slip angle β and the vehicle slip angular velocity Dβ are employed. With respect to the desired slip rate for use in the understeer restraining control, a difference between the desired lateral acceleration Gyt and the actual acceleration Gya is employed. The desired lateral acceleration Gyt is calculated in accordance with the following equations:

$$Gyt = \gamma(\theta f) \cdot Vso;$$

$$\gamma(\theta f) = (\theta f / N \cdot L) \cdot Vso / (1 + Kh \cdot Vso^2)$$

where "Kh" is a stability factor, "N" is a steering gear ratio, and "L" is a wheel base of the vehicle.

At Step 205, the desired slip rate of a front wheel located on the outside of the curve of the vehicle's path is set as "Stufoll", the desired slip rate of a rear wheel located on the outside of the curve is set as "Sturo", and the desired slip rate of a wheel located on the inside of the curve is set as "Sturi". As for the slip rate, "t" indicates a desired value, which is comparable with a measured value indicated by "a" as described later. "u" indicates the understeer restraining control, "r" indicates the rear wheel, "o" indicates the outside of the curve, and "i" indicates the inside of the curve, respectively. At Step 207, the desired slip rate of the front wheel located on the outside of the curve is set as "Stefo", the desired slip rate of the rear wheel located on the outside of the curve is set as "Stero", and the desired slip rate of the rear wheel located on the inside of the curve is set as "Steri", wherein "e" indicates the oversteer restraining control. As noted previously, "FW" indicates a front wheel and "RW" indicates a rear wheel.

At Step 208, the desired slip rate of the front wheel located on the outside of the curve is set as "Stefo", the desired slip rate of the rear wheel located on the outside of the curve is set as "Sturo", and the desired slip rate of the rear wheel located on the inside of the curve is set as "Sturi". That is, when both of the oversteer restraining control and the understeer restraining control are performed simultaneously, the desired slip rate of the front wheel located on the outside of the curve is set to be the same rate as the desired slip rate for use in the oversteer restraining control, while the desired slip rates of the rear wheels are set to be the same rates as the desired slip rates for use in the understeer restraining control. In any cases, however, a front wheel located on the inside of the curve, i.e., a non-driven wheel of a rear drive vehicle is not to be controlled, because this wheel is employed as a reference wheel for use in calculation of the estimated vehicle speed.

The desired slip rates Stefo, Stero and Steri for use in the oversteer restraining control are calculated in accordance with the following equations, respectively:

$$Stefo = K1 \cdot \beta + K2 \cdot D\beta$$

$$Stefo = K3 \cdot \beta + K4 \cdot D\beta$$

$$Stefo = K5 \cdot \beta + K6 \cdot D\beta$$

where K1 to K6 are constants which are set so as to provide the desired slip rates Stefo, Stero which are used for increasing the braking pressure (i.e., increasing the braking force), and the desired slip rate Steri which is used for decreasing the braking pressure (i.e., decreasing the braking force).

On the contrary, the desired slip rates Stufo, Sturo and Sturi for use in the understeer restraining control are calculated in accordance with the following equations, respectively:

$$Stufo = K7 \cdot \Delta Gy$$

$$Stufo = K8 \cdot \Delta Gy$$

$$Stufo = K9 \cdot \Delta Gy$$

where K7 is a constant for providing the desired slip rate Stufo which is used for increasing the braking pressure (or, alternatively decreasing the braking pressure), while K8 and K9 are constants for providing the desired slip rates Sturo, Steri both of which are used for increasing the braking pressure.

Figure 8:
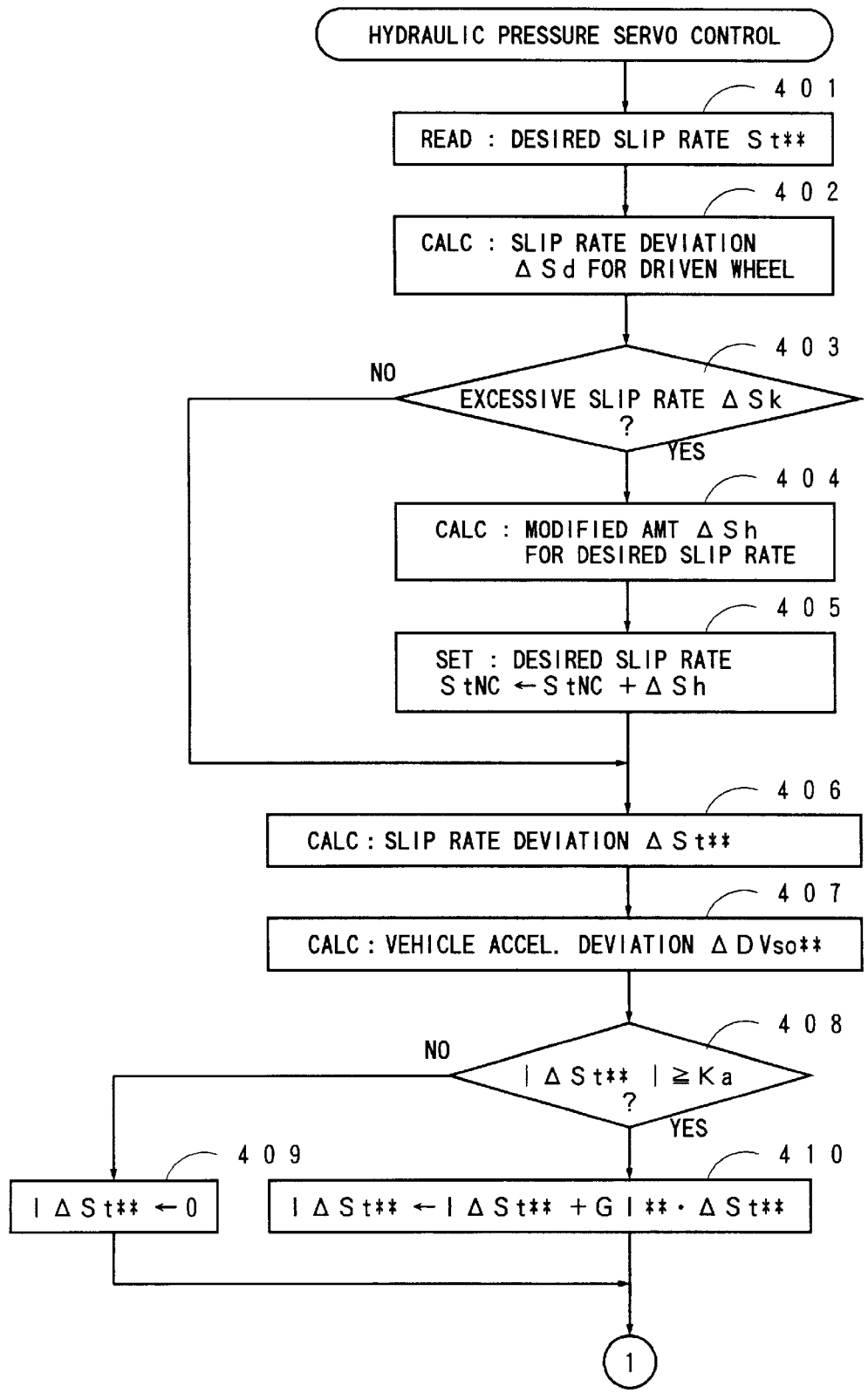
FIG. 8 is a flowchart showing a hydraulic pressure servo control according to the above embodiment of the present invention.
Figure 9:
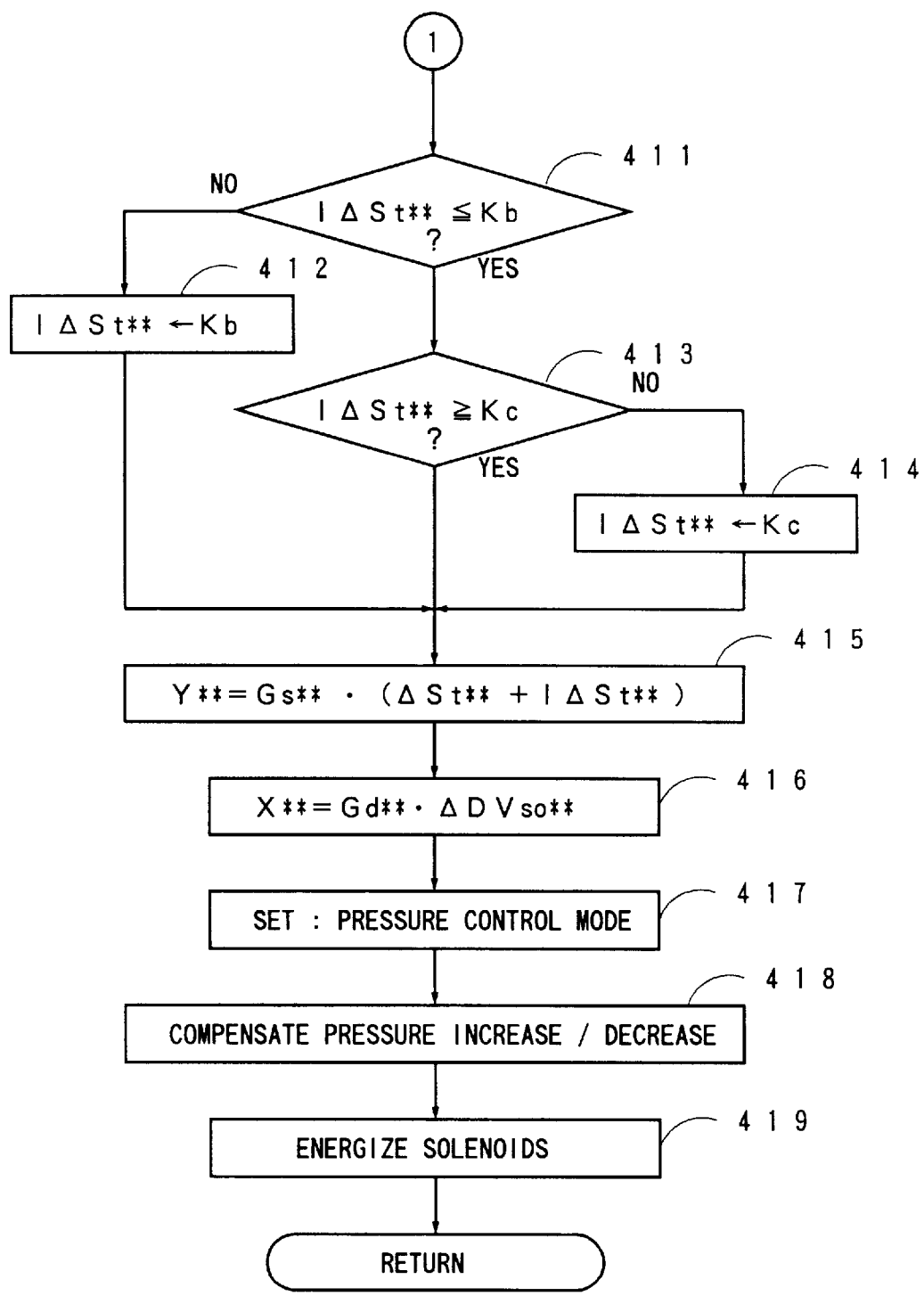
FIG. 9 is a flowchart showing a hydraulic pressure servo control according to the above embodiment of the present invention.

FIGS. 8 and 9 show the hydraulic pressure servo control which is executed at Step 115 in FIG. 6, and wherein the wheel cylinder pressure for each wheel is controlled through the slip rate servo control. At Step 401, the desired slip rates St, which are set at Step 205, 207 or 208, are read to provide the desired slip rate for each wheel of the vehicle. Then, the program proceeds to Step 402 where the slip rate deviation ΔSd between the actual slip rate and the desired slip rate for the driven wheels DL, DR is calculated, and proceeds to Step 403 where it is determined whether the slip rate deviation ΔSd includes the excessive slip rate ΔSk. If it is determined that the slip rate deviation ΔSd does not include the excessive slip rate ΔSk, the program proceeds to Step 406 where the desired slip rate St for each wheel is used. On the contrary, if it is determined that there exists the excessive slip rate ΔSk, the program proceeds to Step 404 where the correction value ΔSh to be added to the desired slip rate for each of the non-driven wheels NL, NR is calculated. Then, the program proceeds to Step 405 where the correction value ΔSh is added to the desired slip rate StNC (StNL or StNR) for the non-driven wheel NL (or, NR), which is read at Step 401, to renew the desired slip rate StNC.

In addition to the above Steps as shown in FIG. 8, various correction values are added to the desired slip rate for each control mode. For example, a correction value ΔSs is added to the desired slip rate St for the anti-skid control to renew the desired slip rate St. A correction value ΔSb is added to the desired slip rate St for the braking force distribution control to renew the latter. A correction value ΔSr is added to the desired slip rate St for the traction control to renew the latter. Then, the program proceeds to Step 406, where a slip rate deviation ΔSt is calculated for each wheel, and further proceeds to Step 407 where a vehicle acceleration deviation ΔDVso** is calculated.

At Step 406, the difference between the desired slip rate St and the actual slip rate Sa is calculated to provide the slip rate deviation ΔSt (i.e., ΔSt=St−Sa). And, at Step 407, the difference between the vehicle acceleration DVso of a wheel to be controlled and that of a reference wheel (i.e., a wheel not to be controlled) is calculated to provide the vehicle acceleration deviation ΔDVso. The actual slip rate Sa and the vehicle acceleration deviation ΔDVso may be calculated in accordance with a specific manner which is determined in dependence upon the control modes such as the anti-skid control mode, traction control mode, or the like.

Then, the program proceeds to Step 408 where the slip rate deviation ΔSt is compared with a predetermined value Ka. If an absolute value of the slip rate deviation |ΔSt| is equal to or greater than the predetermined value Ka, the program proceeds to Step 410 where an integrated value (I ΔSt) of the slip rate deviation ΔSt is renewed. That is, a value of the slip rate deviation ΔSt multiplied by a gain GI is added to the integrated value of the slip rate deviation IΔSt obtained at the previous cycle of this routine to provide the integrated value of the slip rate deviation IΔSt at the present cycle. If the absolute value of the slip rate deviation |ΔSt| is smaller than the A predetermined value Ka, the program proceeds to Step 409 where the integrated value of the slip rate deviation IΔSt is cleared to be zero (0). Then, the program proceeds to Steps 411 to 414 as shown in FIG. 9 where the slip rate deviation IΔSt is limited to a value which is equal to or smaller than an upper limit value Kb, or which is equal to or greater than a lower limit value Kc. If the slip rate deviation IΔSt is greater than the upper limit Kb, it is set to be the value Kb at Step 412, whereas if the slip rate deviation IΔSt is smaller than the lower limit Kc, it is set to be the value Kc at Step 414**.

Figure 12:
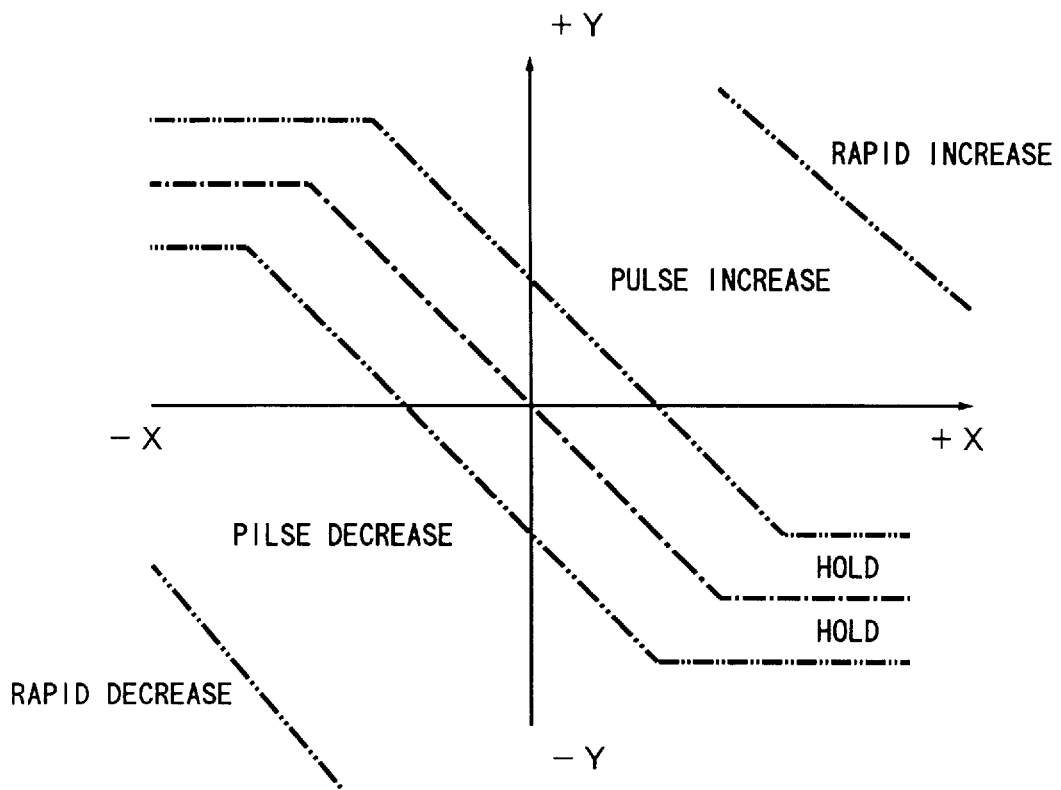
FIG. 12 is a diagram showing the relationship between the pressure control modes and parameters for use in the hydraulic braking pressure control according to the above embodiment.
Figure 13:
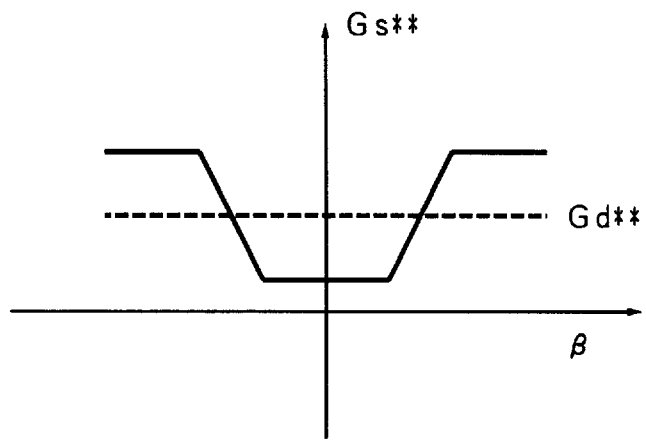
FIG. 13 is a diagram showing the relationship between a vehicle slip angle and a gain for calculating the parameters according to the above embodiment.
Figure 14:
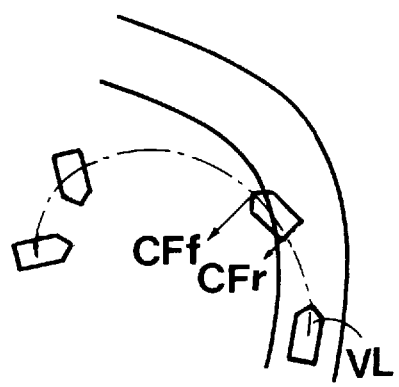
FIG. 14 is a drawing illustrating a state where an excessive oversteer occurs while a conventional vehicle is turning to the left.
Figure 15:
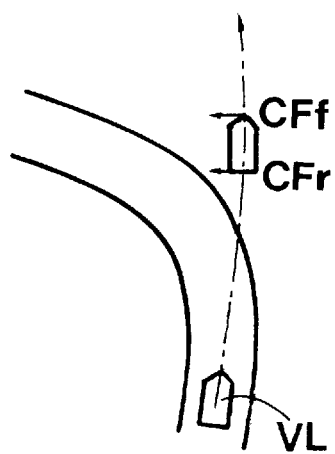
FIG. 15 is a drawing illustrating a state where an excessive understeer occurs while the conventional vehicle is turning to the left.

Thereafter, the program proceeds to Step 415 where a parameter Y** for providing a hydraulic pressure control in each control mode is calculated in accordance with the following equation:

$$Y^{}=Gs^{}\cdot(\Delta St^{}+I\Delta St^{})$$

where "Gs" is a gain, which is provided in response to the vehicle slip angle β and in accordance with a diagram as shown by a solid line in FIG. 13. The program further proceeds to Step 416 where another parameter X is calculated in accordance with the following equation:

$$X^{}=Gd^{}\cdot \Delta DVso^{**}$$

where "Gd" is a gain which is a constant value as shown by a broken line in FIG. 13. On the basis of the parameters X and Y, a pressure control mode for each wheel is provided at Step 417, in accordance with a control map as shown in FIG. 12. The control map has a rapid pressure decreasing zone, a pulse pressure decreasing zone, a pressure holding zone, a pulse pressure increasing zone, and a rapid pressure increasing zone which are provided in advance as shown in FIG. 12, so that any one of the zones is selected in accordance with the parameters X and Y at Step 417. In the case where no control mode is performed, no pressure control mode is provided (i.e., solenoids are off). At Step 418, is performed a pressure increase and decrease compensating control, which is required for smoothing the first transition and last transition of the hydraulic pressure, when the presently selected zone is changed from the previously selected zone at Step 417, e.g., from the pressure increasing zone to the pressure decreasing zone, or vice versa. When the zone is changed from the rapid pressure decreasing zone to the pulse pressure increasing zone, for instance, a rapid pressure increasing control is performed for a period which is determined on the basis of a period during which a rapid pressure decrease mode, which was provided immediately before the rapid pressure increasing control, lasted. Finally, the program proceeds to Step 419** where the solenoid of each valve in the hydraulic pressure control apparatus PC is energized or de-energized in accordance with the mode determined by the selected pressure control zone or the pressure increase and decrease compensating control thereby to control the braking force applied to each wheel.

According to the present embodiment, the steering control by braking is performed irrespective of depression of the brake pedal BP to provide the oversteer restraining control and/or the understeer restraining control. In addition, the steering control by braking is performed appropriately, even when the engine brake is being exerted on the vehicle, as explained before. The braking force is controlled in accordance with the slip rate in the present embodiment. As to a desired parameter for use in the oversteer restraining control and the understeer restraining control, however, any desired parameters corresponding to the braking force applied to each wheel, other than the slip rate, may be employed, such as the hydraulic pressure in each wheel brake cylinder, for example.

It should be apparent to one skilled in the art that the above-described embodiment is merely illustrative of but one of the many possible specific embodiments of the present invention. For example, the present invention may be applied to a front drive vehicle, or even to a four-wheel drive vehicle. Numerous and various other arrangements can be readily devised by those skilled in the art without departing from the spirit and scope of the invention as defined in the following claims.

What is claimed is:

1. A vehicle motion control system for maintaining stability of an automotive vehicle when said vehicle in motion, by controlling a braking force applied to one of driven wheels and non-driven wheels of said vehicle, comprising:

vehicle condition monitor means for monitoring a condition of said vehicle in motion;

braking means for applying a braking force to each wheel of said vehicle, said braking means actuated in response to depression of a brake pedal, and said braking means actuated on the basis of an output of said monitor means and irrespective of depression of said brake pedal;

motion control means for actuating said braking means to apply the braking force to at least one of said wheels on the basis of the output of said monitor means and irrespective of depression of said brake pedal, said motion control means actuating said braking means to apply the braking force to at least one of said wheels so as to cause an increase in turning radius, when an excessive oversteer occurs during vehicle motion, and said motion control means actuating said braking means to apply the braking force to at least one of said wheels so as to cause a decrease in turning radius, when an excessive understeer occurs during vehicle motion;

excessive braking detection means for detecting an excessive braking to at least one of said driven wheels; and correction control means for controlling said motion control means to increase the braking force applied to at least one of said non-driven wheels, when said excessive braking detection means detects the excessive braking to the one of said driven wheels.

2. The vehicle motion control system as claimed in claim 1, wherein said motion control means includes:

desired slip rate setting means for setting a desired slip rate for each of said wheels in accordance with at least the condition of said vehicle detected by said monitor means;

actual slip rate measuring means for measuring an actual slip rate of each of said wheels; and slip rate deviation calculating means for calculating a deviation between the desired slip rate and the actual slip rate, said braking means applying the braking force to each of said wheels on the basis of the deviation calculated by said slip rate deviation calculating means, and wherein said correction control means includes slip rate correction means for correcting the desired slip rate of at least one of said non-driven wheels in accordance with the excessive braking to the one of said driven wheels detected by said excessive braking detection means.

3. The vehicle motion control system as claimed in claim 2, wherein said excessive braking detection means includes excessive slip rate detection means for detecting an excessive slip rate of at least one of said driven wheels on the basis of the deviation between the desired slip rate and the actual slip rate of the one of said driven wheels, said slip rate correction means correcting the desired slip rate of at least one of said non-driven wheels in accordance with the excessive slip rate of the one of said driven wheels detected by said excessive slip rate detection means.

4. The vehicle motion control system as claimed in claim 3, wherein said excessive slip rate detection means includes means for summing the deviations between the desired slip rates and the actual slip rates of said driven wheels to detect the excessive slip rate corresponding to a positive value of the sum of the deviations of said driven wheels.

5. The vehicle motion control system as claimed in claim 1, wherein said braking means comprises:

wheel brake cylinders operatively connected to said driven and non-driven wheels for applying the braking force thereto, respectively;

a hydraulic pressure generator for supplying a hydraulic braking pressure to said wheel brake cylinders; and actuating means disposed between said hydraulic pressure generator and said wheel brake cylinders for controlling the hydraulic braking pressure in said wheel brake cylinders.

6. The vehicle motion control system as claimed in claim 5, wherein said hydraulic pressure generator includes a master cylinder for generating the hydraulic braking pressure in response to depression of said brake pedal, and an auxiliary pressure source for generating the hydraulic braking pressure irrespective of depression of said brake pedal.

7. The vehicle motion control system as claimed in claim 1, wherein said vehicle condition monitor means includes wheel speed sensors for detecting wheel speeds of said wheels, a lateral acceleration sensor for detecting a vehicle lateral acceleration and a yaw rate sensor for detecting a yaw rate, said vehicle condition monitor means calculating an estimated vehicle speed and a vehicle slip angle on the basis of output signals of said wheel speed sensors, said lateral acceleration sensor and said yaw rate sensor, and said vehicle condition monitor means monitoring the condition of said vehicle in motion to determine if the excessive oversteer and/or the excessive understeer occur.

* * * * *